Figure 1:
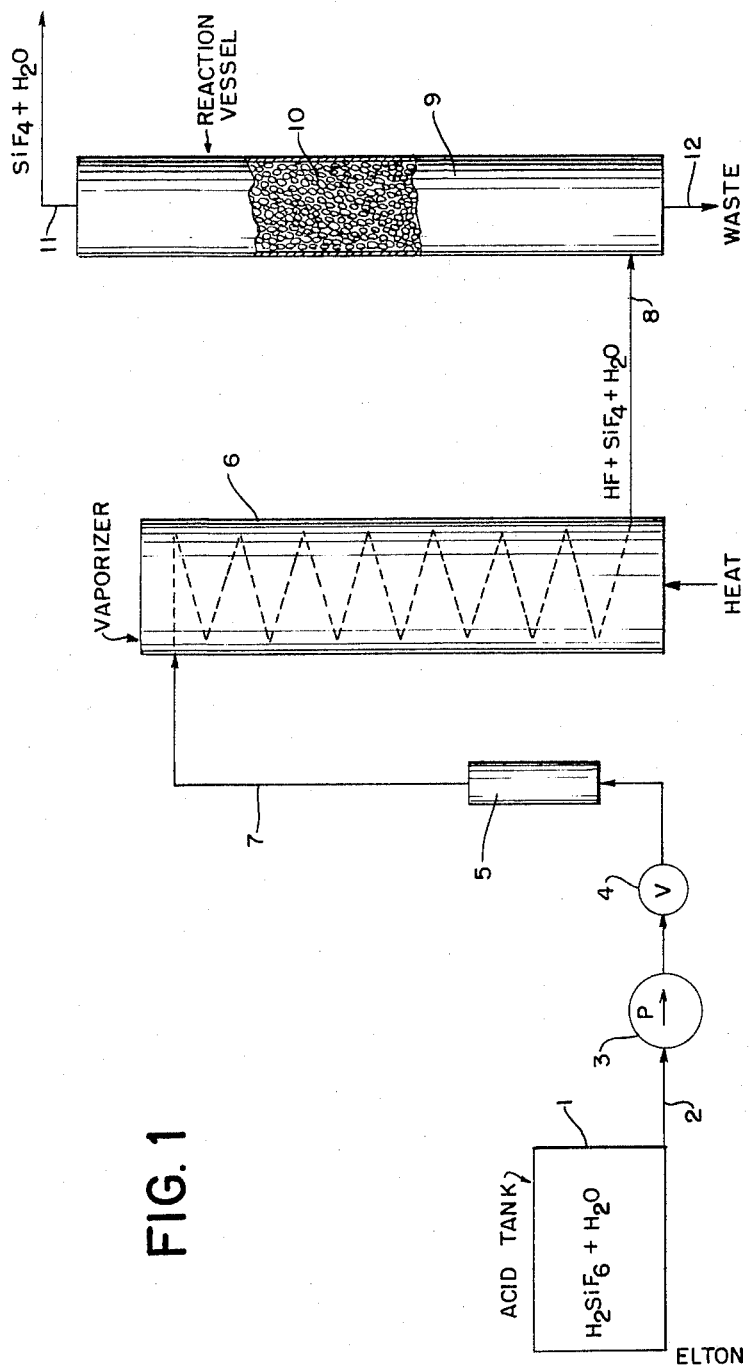

Sept. 20, 1966      E. F. GUNN, JR      3,273,963

PROCESS FOR GENERATING SILICON TETRAFLUORIDE

Filed Jan. 17, 1963      4 Sheets—Sheet 1

INVENTOR.
ELTON F. GUNN, JR.

BY

ATTORNEYS

Sept. 20, 1966     E. F. GUNN, JR     3,273,963
PROCESS FOR GENERATING SILICON TETRAFLUORIDE
Filed Jan. 17, 1963     4 Sheets-Sheet 2

INVENTOR.
ELTON F. GUNN, JR.
BY
ATTORNEYS

Sept. 20, 1966        E. F. GUNN, JR        3,273,963

PROCESS FOR GENERATING SILICON TETRAFLUORIDE

Filed Jan. 17, 1963        4 Sheets-Sheet 3

INVENTOR.
ELTON F. GUNN, JR.

BY

ATTORNEYS

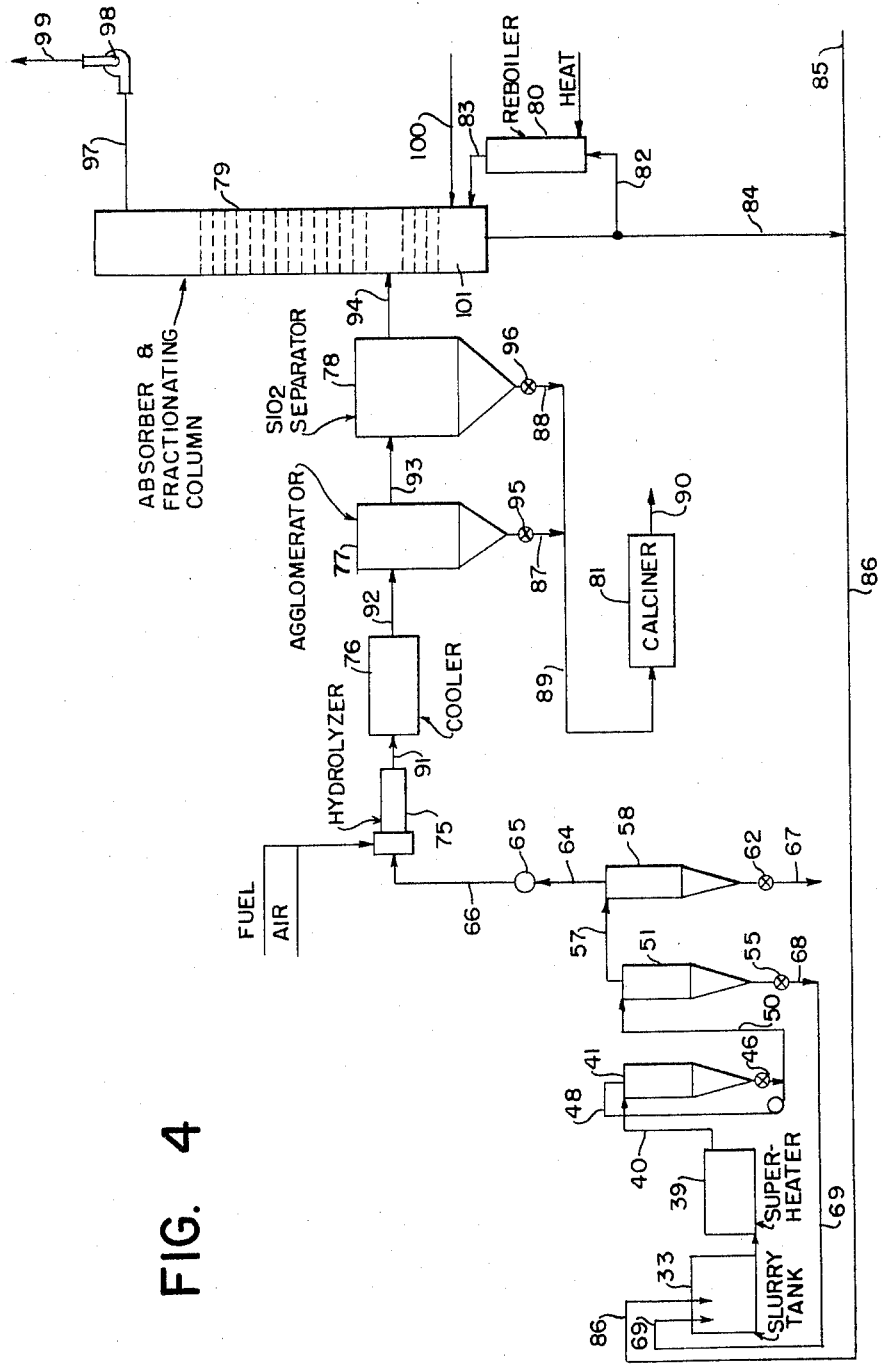

United States Patent Office

3,273,963
Patented Sept. 20, 1966

3,273,963
PROCESS FOR GENERATING SILICON
TETRAFLUORIDE
Elton F. Gunn, Jr., Monroe, La., assignor to Columbian
Carbon Company, New York, N.Y., a corporation of
Delaware
Filed Jan. 17, 1963, Ser. No. 252,153
12 Claims. (Cl. 23—182)

This invention relates to the generation of silicon tetrafluoride and provides a novel and highly effective process whereby fluosilicic acid may be continuously converted to silicon tetrafluoride at high rates and yields. The invention is particularly useful in producing mixtures of silicon tetrafluoride and water vapor which may be reacted by hydrolysis in the vapor phase to form fine, amorphous silicon dioxide and hydrogen fluoride.

Numerous methods are known for producing silicon tetrafluoride from silicon and fluorine-containing compounds, and one of the more classic methods involves reactions between fluospar, sand and sulfuric acid, in which the silicon tetrafluoride is evolved as a gas from the reaction mixture. It is also known that silicon tetrafluoride can be generated by thermally decomposing fluosilicic acid or its silicofluoride salts as indicated by the following equations:

(1) 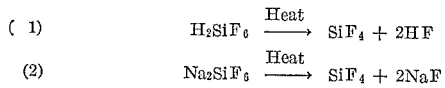

(2) 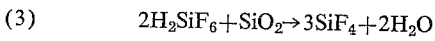

In generating $SiF_4$ from fluosilicic acid, aqueous solutions of the acid must, of course, be employed since the acid is not known to exist in anhydrous form.

When aqueous fluosilicic acid solutions are vaporized, the acid breaks down into the components shown in Equation 1, and the resultant vapor mixture is composed of HF, $SiF_4$ and $H_2O$. When silicon tetrafluoride of high purity is desired, there are disadvantages in obtaining it by vaporizing fluosilicic acid solutions. The vapor components are very difficult to separate, and will revert back to the original acid in solution form if condensation is permitted. Attempts have been made to overcome these disadvantages, and U.S. Patent 2,833,628 describes a process for making high purity $SiF_4$ by reacting fluosilicic acid with sand in concentrated sulfuric acid:

(3) $2H_2SiF_6 + SiO_2 \rightarrow 3SiF_4 + 2H_2O$

The concentrated sulfuric acid not only serves as a liquid vehicle in which the reaction materials are mixed, but it also acts as a desiccant, thereby permitting the evolution of essentially moisture-free $SiF_4$, and prevents the reaction shown in Equation 3 from proceeding to the left. This process allows $SiF_4$ to be generated from fluosilicic acid at very high yields, as essentially all of the fluorine in the acid is reacted with the silica. Silicon tetrafluoride is evolved from the reaction mixture as a gas which contains little if any moisture or HF. However, the process is subject to practical objections.

Recently, a number of processes have been described for making finely divided amorphous silicon dioxide by the vapor phase hydrolysis of $SiF_4$. Such silicas are highly pure and have proven very useful in a number of applications, such as reinforcing agents for elastomers, and as flatting and thixotropic additives for paints and film and coating vehicles. Of particular importance to the commercial operability of such silica processes is the necessity for means which permit continuous, efficient, and economical production of large quantities of $SiF_4$.

In forming the silica, the $SiF_4$ is hydrolyzed with water vapor at temperatures above about 1600° F. More recently, it has been shown that far more water may be present at the time of hydrolysis than is required by the $SiF_4$ to be completely converted to $SiO_2$ and HF. It is not necessary, therefore, that a moisture-free $SiF_4$ be introduced into the hydrolyzing apparatus, and the process is not detrimentally affected when an excessive amount of water vapor is mixed with the $SiF_4$ at the time of its hydrolyzation.

U.S. Patent 2,631,083 describes a process for making fine, amorphous silicas in which the $SiF_4$ is obtained by vaporizing solutions of fluosilicic acid, no means being described for separating the vapor components. Although vaporization of fluosilicic acid solutions provides a continuous and easily practiced method for generating $SiF_4$, the resultant vapors contain two moles of HF per mole of $SiF_4$. This is objectionable where reasonably high purity is desired and also results in reduced yield of the desired $SiF_4$. By my present process, these objections are avoided.

In accordance with the process of my present invention, I utilize the known reaction of Equation 1 to generate a mixture of $SiF_4$, HF and water vapor by vaporizing an aqueous solution of fluosilicic acid and I convert the HF constituent of the resultant vapor mixture to additional $SiF_4$ and water vapor by reacting the HF, without separating it from the other vapors, with crystalline silica, thereby producing a mixture of $SiF_4$ and water vapor substantially free from HF and utilizing all of the fluorine present in the fluosilicic acid.

The reacting of the HF constituent of the vapor mixture with crystalline silica may be effected, in accordance with my present invention, by passing the vapor mixture through a bed of crystalline silica maintained at a temperature within the hereinafter defined range. However, in accordance with an especially advantageous aspect of the invention, the reaction is effected by suspending finely-divided silica in the vapor mixture under the prescribed temperature conditions. Such suspension is advantageously formed by flash-vaporizing an aqueous solution of fluosilicic acid containing finely-divided crystalline silica in suspension. This is effected, for instance, by heating under pressure an aqueous solution of the fluosilicic acid, containing at least sufficient suspended silica to react with the HF resulting from the vaporization, to a temperature at which the solution is flashed into vapor upon reduction of pressure under operating conditions, and injecting the heated suspension into a chamber of such reduced pressure, maintained at the hereinafter defined reaction temperature, wherein the fluosilicic acid solution is flashed into vapor, resulting in a mixture of $SiF_4$, HF and water vapor having the finely-divided silica dispersed therein which quickly reacts with the HF as previously described.

It is recognized that in liquid phase reactions hydrofluoric acid and silica form fluosilicic acid:

(4) 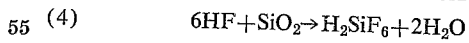

and that $SiF_4$ reacts with water to form fluosilicic acid and silica:

(5) 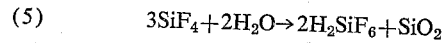

The vapor phase hydrolysis of $SiF_4$ and the vapor solid reaction between silica and HF have been investigated and found to proceed according to the following equation:

(6) 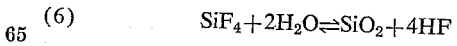

Fenfesty et al., Ind. Eng. Chem. 44, 1448–1450 (1952) reported that reactions 6 proceed significantly to the right only at temperatures of 600° C. and above. It has been found, very surprisingly, that the reaction proceeds to the left most significantly at temperatures between 250° F. and 450° F., with over 90% of the HF being reacted with silica within the range from 250° F. to 370° F.

I have found it possible, therefore, to commingle the vapors of SiF$_4$ and water without the formation of silica, provided the vapors are maintained below about 600° C. but above the condensation point of the water. It is also possible, on the other hand, to contact a vapor mixture containing HF and water vapor with silica to form high yields of silica tetrafluoride and water vapor, if the reaction temperature is not allowed to exceed about 450° F. and the vapors not permitted to condense.

I have now discovered that vaporized solutions of fluosilicic acid, composed of SiF$_4$, HF and water vapor, behave in a similar way. The mixed vapors can be maintained without the formation of silica, and the HF constituent thereof made to react with silica to form additional SiF$_4$, by maintaining carefully controlled reaction temperatures.

It is essential to the successful operation of my process that the temperature of the vapor mixture resulting from the vaporization of the fluosilicic acid solution not be permitted to fall below its dew point, i.e., the water constituent must be maintained entirely in vapor form. It is likewise essential that the temperature of the resultant SiF$_4$-water vapor mixture be maintained above its dew point. Further, the zone of reaction within which the HF constituent of the vaporized fluosilicic acid is reacted with the crystalline silica must be maintained at a temperature within the range from about 250° to about 450° F., more advantageously within the range from 250° to 370° F.

The process of my present invention will be further described with reference to the accompanying drawings illustrating commercial installations for practicing the process. It will be understood, however, that the invention is not restricted to the particular embodiments thereof illustrated.

Figure 2:
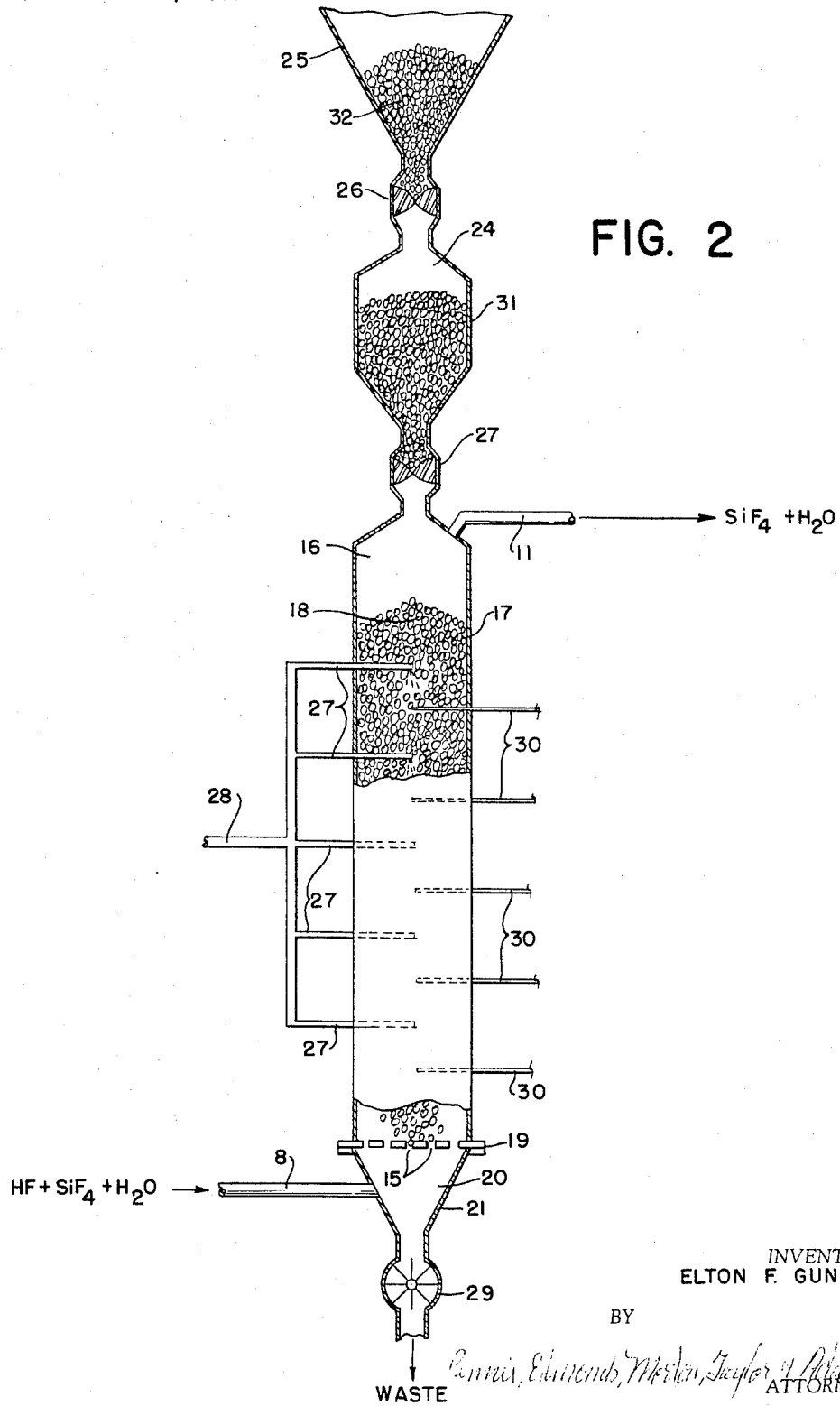
Figure 3:
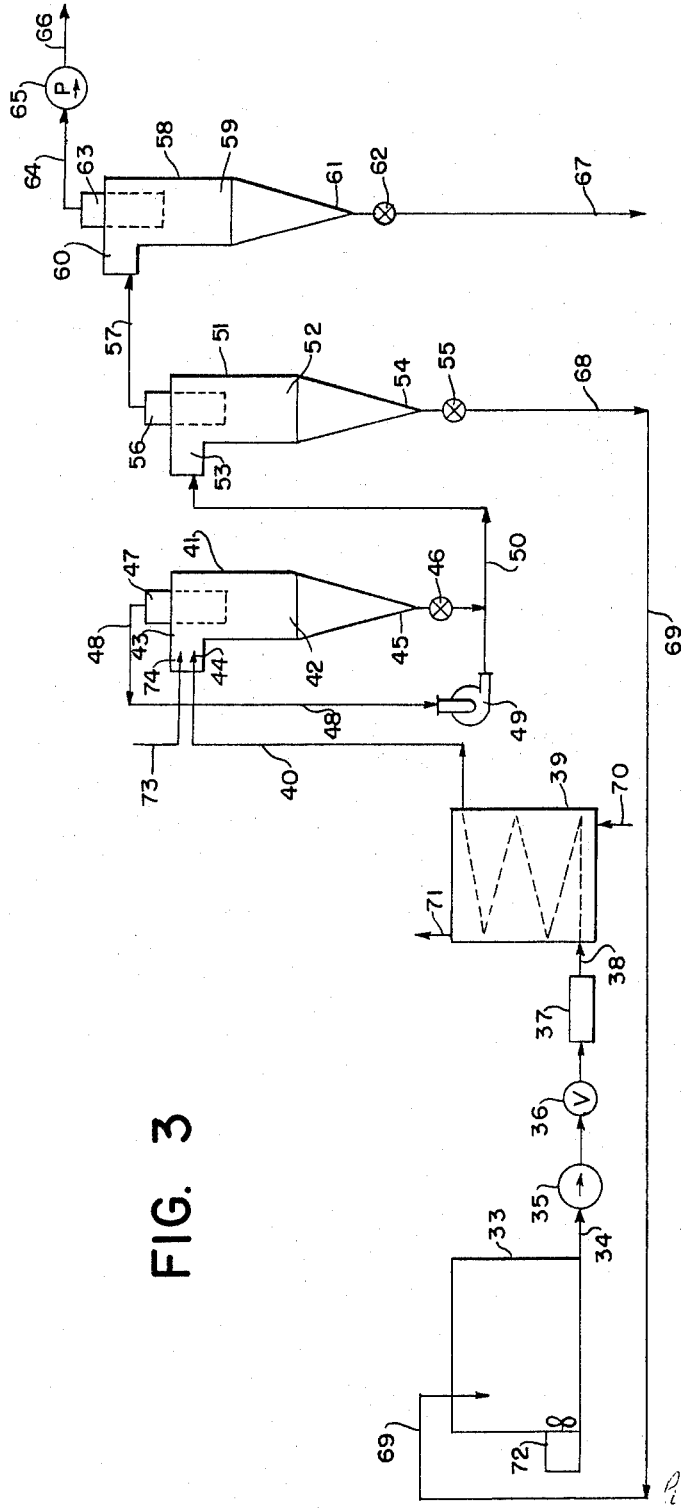

Referring to the drawings:

FIG. 1 is a flow sheet of a process in which a mixture of silicon tetrafluoride and water vapor, substantially free from HF, is generated by passing vaporized fluosilicic acid through a bed of silica pebbles, FIG. 2 represents a reactor vessel which may, with advantage, be used in the process shown in FIG. 1, FIG. 3 is a flow sheet of a process in which silicon tetrafluoride and water vapor are generated by reacting finely divided silica particles with fluosilicic acid vapors while the silica is suspended in the vapors.

FIG. 4 is a flow sheet of an operation in which the process of FIG. 3 is employed in a process for making fine, amorphous silica by vapor phase hydrolysis of the silicon tetrafluoride.

Referring particularly to FIG. 1, an aqueous fluosilicic acid solution is contained in tank 1, is removed through line 2 by pump 3 and passed through a flow regulating device 4 and a flow measuring device 5. A regulated flow of the acid solutions is introduced into the acid vaporizer 6 through line 7. Sufficient heat is supplied to the vaporizer 6 by any suitable means to completely vaporize the acid solution therein, and the H$_2$SiF$_6$ is thereby decomposed to HF and SiF$_4$. The resultant vapor mixture composed of HF, SiF$_4$ and H$_2$O leave the vaporizer 6 through line 8 and is passed to a reaction vessel 9 which contains a bed of crystalline silica pebbles 10. The vapor mixture passes through the bed of silica pebbles, maintained at a temperature of 250°–450° F., and the HF constituent of the vapors reacts with the silica to form SiF$_4$ gas and water vapor. Leaving the reactor vessel 9 through line 11 is a vapor mixture composed of SiF$_4$, water vapor and not more than a small proportion of unreacted HF. Waste residue from the silica pebbles is discarded through line 12.

The effluent gas mixture from the reactor vessel 9 is passed through line 11 to other equipment in which the silicon tetrafluoride is utilized, e.g., converted to silica and HF, while being maintained at a temperature above its dew point.

The fluosilicic acid contained in tank 1 may be made by reacting fine quartz sand or a finely ground novaculite with hydrofluoric acid solution; or, a filtered acid from a superphosphate process may be employed. The invention may be made to work with fluosilicic acid of any strength, but when the SiF$_4$ is generated for use in a process for making fine amorphous silicas, it is preferable that the solution have a content of H$_2$SiF$_6$ which is at least 30% by weight.

Since the fluoride solutions and vapors involved in the operations are corrosive, all equipment containing them should be constructed of materials which are resistant to attack, or some other form of protection, such as coatings, should be provided. Materials adequate for the purpose are commercially available and are familiar to those skilled in the art of handling HF, SiF$_4$ and H$_2$SiF$_6$.

The acid vaporizer 6 may, for instance, be a heat exchanger containing a single convoluted tube, a series of straight tubes, or any other suitable arrangement. I have used a coil of Monel pipe having a silver plated interior, while said coil was immersed in a salt bath having heat supplied by a flame.

FIGURE 2 represents a reaction vessel which is especially suitable for use in the process described with reference to FIG. 1. The cylindrical, vertically elongated chamber 16 is enclosed by wall 17 and contains a bed 18 of quartz pebbles. Chamber 16 is separated from chamber 20 by a perforated plate 19 which serves to retain the silica pebbles within chamber 16 and to uniformly distribute fluosilicic acid vapors over the cross section of bed 18. After the fluosilicic acid has been vaporized, the resultant vapor mixture is transmitted through line 8 to chamber 20 and passes through the perforations 15 of the plate 19 into the bed 18. The vapors are introduced into chamber 20 in a slightly superheated state, so that they do not condense within line 8, chamber 20 or the bed 18. In practice, I generally superheat the vapors to about 270° F. to 300° F.

Within the bed, the HF portion of the vapors reacts with the silica to form SiF$_4$ and water vapor. Since the reaction is exothermic, it is desirable to make provisions for controlling the temperature so that the reaction can be carried on continuously at temperatures below 450° F. and preferably within the range 250° F. to 350° F. For this purpose, water or a portion of the H$_2$SiF$_6$ solution may be injected directly into the bed 18 as a spray of fine droplets, being introduced into the bed by atomizers 27 which are fed by line 28. The amount of cooling liquid required is determined primarily by the rate of reaction, and in any case the quantity is small in proportion to the amount of reaction vapors involved.

Condensation of the vapors within chamber 16 should be prevented, and it is the purpose of the cooling liquid to absorb exothermic heat and thereby be transformed into vapor. The reaction temperature should be kept below 450° F. in any case as the reaction of HF with SiO$_2$ is markedly decreased at higher temperatures. The temperature of the reaction is conveniently determined by a series of thermocouples 30, which are installed throughout the bed 18.

Located above chamber 16 is a cylindrical chamber 24 enclosed by wall 31. A hopper 25 is situated above chamber 24, and contains a supply of silica pebbles 32, which is used to periodically replenish the bed 18 in chamber 16. By opening the rubber punch valve 26 while another such valve 27 is closed, silica pebbles slide out of the hopper 25 into chamber 24. Valve 26 is then closed and valve 27 opened, allowing the pebbles in chamber 24 to fall into chamber 16. When the valves are properly opened and closed in such a manner, measured amounts of silica are introduced into chamber 16 without an excessive loss of reaction vapors to the atmosphere.

I find particular advantage in using hard, quartz pebbles to form the bed 18. Such pebbles are available having a purity in excess of 95% silica, and I prefer to use those having a diameter from three-eighths of an inch to one inch. Beds formed from such pebbles create interspaces of sufficient size so that little pressure drop occurs over several feet of bed height.

Since the reaction proceeds rapidly and efficiently at atmospheric pressure, the pressure within chamber 16 is advantageously maintained within the range of about one pound above to a few inches of water below atmospheric pressure.

Impurities in the silica pebbles do not react with hydrogen fluoride. As the pebbles are reduced in size by reaction with the acid vapors, these impurities at first form on the surface of the pebbles as a fine, dense powder which finally flakes off and drifts down through the bed toward plate 19. The powdered impurities eventually fall through the perforations 15 of plate 19 into chamber 20, where they slide down the sloping walls 21 of chamber 20 into a rotary lock 29, through which said impurities are removed from the system.

Vapors leaving the top of the chamber 16 pass through line 11 to the operation in which the $SiF_4$ is to be used. Means for separating dusts from the effluent vapors may be placed in line 11 to remove very fine solid materials which may become entrained by the vapors within chamber 16. A cyclone separator is very suitable for this purpose, but other apparatus, such as a filter, may be used.

A reaction vessel of the type described which has been used with advantage is one in which the walls 21, 17 and 31 were of metal having an interior plating of silver. Lock 29, atomizers 27, thermocouples 30 and the lines 8 and 11 may be similarly constructed or they may be lined or coated with a plastic material such as a fluorocarbon.

Vapors should not be permitted to condense within the system, and walls 17 and 21, lock 29 and conduits 8 and 11 should be thoroughly insulated, lest they be excessively cooled by the atmosphere.

By using such a reaction vessel in the manner described, vapor mixtures composed of HF, $SiF_4$ and $H_2O$ have been so processed that essentially all of the HF present reacted with the silica to form additional $SiF_4$ and water vapor.

Where the HF is to be reacted with silica suspended in the vapor mixture, apparatus such as illustrated in FIG. 3 may be used. A slurry composed of fluosilicic solution and finely ground silica particles is pumped under pressure through a superheater, wherein the temperature of the mixture is raised above its atmospheric boiling point. The superheated slurry is then sprayed into an insulated chamber having an internal pressure maintained at about one atmosphere. The spary of slurry droplets flashes into vapor and the fine silica particles become suspended in this vapor. More specifically, the $H_2SiF_6$ decomposes into HF and $SiF_4$ so that a vapor mixture of HF, $SiF_4$ and $H_2O$ is formed and the fine particles of silica react with the HF while suspended in the vapor mixture.

Suitable means should be provided to assure that the solid particles remain in suspension for a sufficient length of time to permit an efficient reaction. This can be accomplished by passing the vapors and the silica particles through a long conduit at a velocity which creates enough turbulence to prevent settling out of the silica particles; or some other means may be employed which permits the particles to be suspended in the vapor until all the HF has reacted with said particles.

When practicing the invention in this manner, it has been found most suitable to circulate the vapor-solids mixture within one or more reaction chambers which have the configuration and the operating principles of a conventional cyclone separator. The process will be further described and clarified in reference to FIG. 3.

A slurry composed of an aqueous fluosilicic acid solution and finely ground crystalline silica are contained in tank 33. The slurry may be made up by adding the silica to an $H_2SiF_6$ solution or an unfiltered acid derived from a superphosphate process and containing suspended silica may be employed or an excess of silica may be added to an HF solution to form $H_2SiF_6$ which slurries with the excess silica. In the first and last case sufficient silica is suspended in the solution to react with all of the HF which is liberated when the $H_2SiF_6$ decomposes. Unfiltered fluosilicic acids are derived from superphosphate processes which contain more than enough silica for this purpose, and when these are used, no more silica need be added. The contents of the tank 33 should be agitated to assure that the silica remains thoroughly dispersed in the solution, and this may be accomplished with a recirculation pump or a propeller mixer 72.

The silica added to the acid solutions in forming the slurry should be very finely ground and for this purpose I have used commercially available novaculite having a purity in excess of 95% silica and which was ground to a particle size of less than 50 microns.

The slurry is removed from the tank 33 through line 34 by pump 35, and is passed through a flow regulating device 36 and a flow measuring device 37. A regulated flow of the slurry is thereby passed by way of line 38 into the slurry superheater 39. The slurry is heated to above its atmospheric boiling point within the superheater 39, which is a multiple pass heat exchange. A heating fluid is supplied to the superheater, entering through line 70 and leaving through line 71. Sufficient pressure is furnished by pump 35 to keep the slurry from boiling within the superheater 39. Leaving the superheater, the slurry passes by way of line 40 to an atomizer 44 located within the inlet duct 43 of a cyclone separator 41. Operating pressure within the superheater 39 and line 40 are established and made relatively uniform by using an atomizer tip 44 of sufficiently small orifice.

The atomizer 44 converts the regulated flow of slurry into a fine spray of droplets within the inlet duct 43 of cyclone 41. Since the internal pressure of the cyclones is operated near atmospheric pressure, the liquid portion of the slurry droplets is quickly converted to vapor by heat absorbed at the superheater. The finely subdivided silica particles become suspended in these vapors, and the mixture leaves the inlet 43 and enters the interconnecting chamber 42 of cyclone 41.

The mixture enters cyclone chamber 42 in a direction which is tangential to its circular cross-section, so that the vapors and silica particles spin downwardly toward the solids outlet 45 of the cyclone. At a point near this outlet, unreacted silica separates from the spiraling vapors, and is removed from chamber 42 through the solids outlet 45 and gastight rotary lock 46.

Upon vaporization of the superheated spray of slurry droplets, the $H_2SiF_6$ decomposes into HF and $SiF_4$. The HF constituent of the resultant HF, $SiF_4$ and $H_2O$ vapor mixture reacts with the silica particles as all the constituents spin downwardly toward the solids outlet 45. After approaching a point near the solids outlet, the vapors reverse their course and, while still spiraling, move upwardly toward the outlet 47 of cyclone 41 while following a path symmetrical with the vertical center line of chamber 42.

All of the HF introduced into chamber 42 may not be reacted with silica therein, and since the silica which does not react with the HF is removed from the chamber 42 through the outlet 45, I make provision for resuspending said silica particles in the effluent gases from chamber 42, so that when said effluent gases contain HF, further opportunity is afforded the HF to react with the silica. The effluent gases are removed from cyclone 41 through line 48 and are passed to a gas blower 49. The gas blower propels the vapors along line 50 to a second cyclone separator 51. The silica particles which are removed from chamber 42 through rotary lock 46 are dropped into line 50 where they are resuspended within the vapors being passed from cyclone 41 to cyclone 51. This reformed vapor-solids mixture is introduced into the inlet 53 of cyclone 51. Reaction of the HF and silica continues, therefore, within line 50 and cyclone chamber 52. One or more additional cyclones such as 51 may be used to afford adequate contact time between the HF and the silica particles and in such a case additional lines such as 48 and 50 and a gas blower such as 49 will be provided to circulate the vapor-solids mixture from one cyclone to another.

The reformed solids-vapor mixture introduced into cyclone 51 spirals down the walls of chamber 52 and the majority of the silica particles which are not reacted with HF are removed through the solids outlet 54 and the rotary lock 55. If all the HF is not reacted with silica in cyclone 51, the effluent vapor from said cyclone may be remixed with the silica particles taken from its solids outlet and passed to still another cyclone. When silica is introduced into the system in amounts greater than will be reacted with the HF, the majority of said excess is removed from the system through the solids outlet of the last cyclone, such as 51, into which a reformed mixture of silica and vapor has been introduced. The solids removed from cyclone 51 through the solids outlet 54 and rotary lock 55 may be disposed of as waste or returned to tank 33 to be used in forming more slurry.

The effluent vapors which leave cyclone 51 through its gas outlet 56 often contains a small quantity of solid particles which were not separated in cyclone 51. These vapors may be passed through line 57 to still another cyclone 58 which serves to remove any entrained solid particles. Solid particles removed from cyclone 58 through the rotary lock 62 may be returned to the slurry tank 33 when the particles are high in silica content or disposed of as waste when they are composed primarily of undesirable or nonreactable impurities. If more than one cyclone is needed to perform the function of cyclone 58, a multi-cyclone may be employed instead.

The effluent vapors from cyclone 58 are composed primarily of $SiF_4$ and $H_2O$ and they are removed from the cyclone through its gas outlet 63 and passed to a gas blower 65 through line 64. The vapors are then transmitted through line 66 to other apparatus or process steps in which said vapors are utilized or processed to achieve some further advantage, e.g., a hydrolyzer in which the vapors are converted to silica and HF.

Since the reaction between silica and HF is exothermic, a coolant may be introduced into chamber 42 to prevent temperatures in excess of 450° F. within chambers 42, 52 and 59. Water has been used as the coolant, being introduced as a fine spray into chamber 42 through line 73 and atomizer tip 74. The fine water droplets absorb heat liberated by the $HF-SiO_2$ reaction, and are transformed into steam. Relatively small amounts of water are usually required to maintain the reaction within the most desirable range of 250° F.–350° F.

Although fluosilicic acid solutions of any strength can be decomposed and reacted with silica by the process of FIG. 3, solutions composed of about 30% $H_2SiF_6$ by weight are best employed when the invention is used to generate $SiF_4$ which is to be hydrolyzed in the vapor state to form fine, amorphous silica.

In copending application Ser. No. 113,270, filed May 29, 1961, of which I am a co-applicant, we have described and claimed a process for producing pigmentary silica by vapor phase hydrolysis of silicon tetrafluoride wherein the liberated HF is collected, concentrated and reacted with crystalline silica to generate the $SiF_4$-water vapor mixture used in the said vapor phase hydrolysis step. My present process for generating the $SiF_4$-water vapor mixture is especially useful in conjunction with the vapor phase hydrolysis step, the HF collection and concentration step and the pigmentary silica collection step described in said pending application. However, my present method for generating the $SiF_4$-water vapor mixture is essentially different from that described in our copending application and permits the use of the collected and concentrated hydrofluoric acid for other purposes, presently to be described.

In accordance with the process of said copending application, an aqueous solution of the HF from the collection system is vaporized before being passed in contact with the crystalline silica to generate the $SiF_4$. As there disclosed, the recycled acid solution may contain a small proportion of $H_2SiF_6$ when the hydrolysis is not carried to completion and separation of the pigmentary silica from the effluent gases is imperfectly performed. Any fluosilicic acid which may be present in the recycled hydrofluoric acid solution would, upon vaporization of said solution, be converted to $SiF_4$ and HF. But, in any event, the fluosilicic acid present would represent only a very minor proportion of the fluorine content of the recycled HF solution and would have little or no effect on the functioning or economy of the process. As distinguished therefrom, the fluosilicic acid, vaporized in accordance with the present invention, is one in which the fluorine content is predominantly $H_2SiF_6$.

In the conventional process for making superphosphate fertilizers, phosphate rock is treated with a mixture of phosphoric and sulfuric acids. Since the rock usually contains silica and calcium fluoride as impurities, HF is liberated which reacts with the silica to form fluosilicic acid. In the presence of phosphoric or sulfuric acids at high temperature, the fluosilicic acid is decomposed to $SiF_4$ and HF. The $SiF_4$ is reacted with water in the liquid state to form fluosilicic acid and silica particles. The silica may be removed from the fluosilicic acid, and this is often accomplished by filtration. Herein the term "filtered acids" is intended to include fluosilicic acid solutions derived from a superphosphate process which contain essentially no free silica particles. The term "nonfiltered acids" is intended to include fluosilicic acid solutions derived from a superphosphate process which have a content of silica particles ranging as high as one mole of silica per two moles of fluosilicic acid.

The process, as represented by FIG. 4, permits the fluosilicic acids derived from a superphosphate process to be converted to two useful and valuable products, namely, hydrofluoric acid and fine, amorphous silica. A novel use is thus provided for both the filtered and the nonfiltered fluosilicic acid solutions.

Referring to FIG. 4, slurries of aqueous $H_2SiF_6$ solutions and silica are formed, superheated, vaporized and reacted as described with reference to FIG. 3. The resultant enriched $SiF_4$-water vapor mixture leaves cyclone 58 through line 64 and is propelled by blower 65 through line 66 to a vapor phase hydrolyzer 75, such, for instance, as described in our said copending application. The $SiF_4$-water vapor mixture is mixed with air and a gaseous fuel within the hydrolyzer 75, and the air and fuel are burned therein to furnish heat for the endothermic hydrolysis reaction between the $SiF_4$ and water vapor.

Leaving the hydrolyzer by way of line 91 is a heated mixture composed of very fine amorphous silica, combustion flue gases, HF vapor, water vapor and perhaps some unhydrolyzed $SiF_4$. The hot vapors and silica are conveyed through line 91 to a cooler 76 in which the temperature of the mixture is reduced before it is conveyed by line 92 to an agglomerator 77. The vapors and flocs of silica leave the agglomerator through line 93 and are passed into a separator 78 in which the silica is removed from the vapors. A portion of the silica flocs is separated from the vapors within the agglomerator 77, said separated silica being removed from the agglomerator through rotary lock 95. The silica separated in separator 78 is removed therefrom through rotary lock 96. The collected silica is conveyed through lines 87, 88 and 89 to a calciner 81, wherein final traces of fluorine are removed from the silica before it is conveyed by line 90 to storage or packaging facility.

The vapors which leave the separator 78 are composed primarily of combustion products, moisture, HF and possibly a small portion of unhydrolyzed SiF$_4$. These vapors also may contain a small quantity of silica which was not removed by the separator. The separator effluent is passed through line 94 into an acid absorption and fractionating column 79. HF and any SiF$_4$ present are dissolved in water condensed in the column 79, which column contains a series of plates and bubble caps. Any silica particles entrained in the vapors are trapped in the acid solution as they pass through the column, and said particles ultimately react with the acid to form H$_2$SiF$_6$.

The solution collects in the bottom section 101 of column 79, to be re-evaporated by heat supplied by the reboiler 80. Solution is removed from the bottom section 101 of the tower through line 84 and passed into the reboiler 80 through line 82. Boiling solution is conducted back to the bottom of the tower through line 83. The acid is thus concentrated by evaporation until a satisfactory strength has been obtained.

The concentrated acid solution which is removed from the bottom section 101 of tower 79 through line 84 contains about 30–32% HF and may contain a small amount of H$_2$SiF$_6$, as previously described.

When fluosilicic acid solutions derived from a superphosphate process are used for generating the SiF$_4$, the acid solution removed from tower 79 may be passed by way of lines 84 and 85 to an acid storage tank or processing apparatus in which the acid is further concentrated, purified, or used to advantage.

When the fluosilicic acid employed in my process is made up by dissolving silica in hydrofluoric acid, it is desirable to recycle the acid from the tower 79 back to the slurry tank 33, through line 86, where it can be used to reform aqueous fluosilicic acid or a slurry containing unreacted silica.

Any unabsorbed gases and uncondensed vapors are removed from the top of the tower 79 through line 97 by gas blower 98, and are exhausted into the atmosphere through a stack 99.

When the acid solution is to be recycled, hydrofluoric acid may be periodically introduced into the system to compensate for any loss. This is conveniently added in solution form through line 100 into the bottom section 101 of tower 79.

The invention and its effectiveness will be illustrated by the following specific examples:

*Example I*

A bed of crystalline silica pebbles having a diameter of ⅜ to ¾ inch and a purity greater than 95% silica was placed in a reaction vessel of circular cross-section, eight inches in diameter, and of a height of 60 inches. Pebbles were not fed into the reaction chamber to replenish the bed in this case, a batch charge weighing 100 pounds being used instead.

After first heating the pebble bed to a temperature of 280° F., a 30%, by weight, fluosilicic acid solution was vaporized by passing it through a heated coil of silver plated Monel pipe at the rate of 25 pounds per hour. Superheating of the vapors was also accomplished in this same coil of pipe and the effluent vapors were at a temperature of about 300° F.

The resultant vapor mixture, consisting of HF, SiF$_4$ and H$_2$O, was passed upwardly through the bed of preheated silica pebbles, wherein the HF reacted with the silica to form additional SiF$_4$ and water vapor. The reaction temperature was maintained between 300° F. and 350° F. by intermittently introducing small amounts of water into the bed through spraying nozzles.

The vapors removed from the top of the reaction chamber were passed to a vapor phase hydrolyzing device. Before the vapors were hydrolyzed, they were thoroughly mixed with air and natural gas which had been preheated to a temperature of about 280° F. The air and natural gas were burned in the hydrolyzer to supply heat for the hydrolysis reaction which was maintained at about 2200° F.–2400° F.

Effluent gases from the hydrolyzer were passed to a silica collection system, such as described herein, maintained above 450° F., wherein in excess of 90% of the fine, amorphous silica was separated from the vapors. The vapors leaving the collector were passed to an acid absorber wherein practically all of the HF in the vapor was dissolved in water. Unhydrolyzed SiF$_4$ was also removed from the vapors by the absorber, as were silica particles which escaped past the silica collector.

After 100 pounds of the 31% H$_2$SiF$_6$ solution was vaporized and passed through the bed of silica pebbles, the operation was suspended and the pebbles were removed from the reaction chamber. Weighing revealed that the pebbles had been reduced in mass by about 6 pounds, and since they were found to be essentially free of materials volatile below 400° F., both before and after reaction, it was apparent that a highly efficient reaction had occurred between the silica and the HF constituent of the vapor mixture.

Further evidence of the reaction and the concomitant advantage of the invention in a process for making fine amorphous silica is evidenced by the fact that about 15.4 pounds of very light, flocculant amorphous silica was recovered from the reaction vapors by the SiO$_2$ collector. This silica was found by analysis to have a mean particle size of 19 millimicrons and a surface area of 162 meters per gram.

Had the HF constituent of the vapors not been reacted with the crystalline silica prior to the hydrolysis, no more than about 13 pounds of amorphous silica could have been formed.

*Example II*

500 pounds of 31%, by weight, hydrofluoric acid solution was added to a rubber-lined tank along with 120 pounds of highly pure novaculite which had been ground to a particle size of about 50 microns. After the acid and a portion of the silica had reacted to form fluosilicic acid, the resultant slurry was pumped through a superheater at the rate of 100 pounds per hour. While maintaining a pressure of about 50 pounds per square inch on the slurry, its temperature was raised to about 260° F. to 270° F., and it was then passed to an atomizer nozzle located within the inlet of a cyclone separator, the internal pressure of the cyclone being maintained near atmospheric pressure. The cylindrical body of the cyclone had a diameter of 12 inches.

The atomizer transformed the superheated, liquefied stream of slurry into a spray of fine droplets. The liquid portion of these droplets was rapidly transformed into vapor by absorbed heat, with the H$_2$SiF$_6$ decomposing into HF and SiF$_4$. The silica particles were thus entrained in the resultant HF, SiF$_4$ and H$_2$O vapors, so that the HF and silica reacted within the cyclone chamber, the temperature of the cyclone being maintained between 250° and 450° F.

Unreacted silica particles were removed from the solids outlet of the cyclone and remixed with the effluent vapors from the same cyclone. This reformed vapor-solids mixture was passed to a second cyclone having a diameter of 12 inches across its cylindrical body. The unreacted solids were removed from the solids outlet of this second cyclone and were again remixed with the effluent gas stream therefrom and passed to another cyclone having the same dimensions. The unreacted solids removed from this third cyclone were retained for weighing. The effluent gas stream from the third cyclone was passed to another, where residual solids entrained in the vapors were finally reacted or removed through its solids outlet.

The effluent gases removed from the fourth cyclone were passed to a hydrolyzer, of the type described, in which the silicon tetrafluoride portion of the vapor was transformed into fine, amorphous silica and HF by vapor phase hydrolysis, conducted at 2100° F.–2400° F. The fine, amorphous silica and the vapors leaving the hydrolyzer were passed to a collection system in which the silica was separated from the vapors. Effluent materials from the collector were conducted to an acid absorption tower where HF, unreacted $SiF_4$ and uncollected $SiO_2$ were trapped in water.

Operations were suspended after all of the slurry had been reacted within the first mentioned cyclones, and the resultant vapor had been passed to the hydrolyzer. About 6 pounds of unreacted solids were removed from the third and fourth cyclones, while 97.5 pounds of fine amorphous silica were removed from the collector. Had the HF constituent of the vapor mixture not been reacted with silica prior to the hydrolysis, it would have been possible to form only about 78 pounds of amorphous silica by hydrolysis of the $SiF_4$ formed by decomposing the $H_2SiF_6$.

Examination of the silica formed by hydrolysis showed that it had a mean particle size of 18 millimicrons and a surface of 172 meters per gram. It was found to be practically free of contamination by the relatively large crystalline silica particles used to form the slurry.

I claim:

1. The method of generating mixtures of $SiF_4$ and water vapor substantially free from HF which comprises vaporizing an aqueous solution of predominantly fluosilicic acid, thereby forming a vapor mixture of $SiF_4$, HF and water, contacting said vapor mixture with crystalline silica maintained in an essentially dry state at a temperature above the condensation point of the vapors but less than about 450° F., thus converting the HF of the vapor mixture to additional $SiF_4$ and water vapor and thereby producing a reformed vapor mixture of $SiF_4$ and water that is substantially free of HF while having a water content substantially in excess of the amount produced by the aforesaid conversion of HF to $SiF_4$ and water vapor.

2. The process of claim 1 in which the reaction temperature is maintained within the range from about 250° to about 370° F.

3. The process of claim 1 in which the crystalline silica is quartz.

4. The process of claim 1 in which the reaction is effected by passing the vapor mixture through a bed of crystalline silica.

5. The process of claim 1 in which the reaction is effected by suspending finely-divided particles of crystalline silica in the vapor mixture.

6. The process of claim 5 in which the molar ratio of hydrogen fluoride to silica in the suspension does not exceed about 4:1.

7. The process of claim 5 in which the crystalline silica is novaculite.

8. The process of claim 5 in which the suspension is produced by flash vaporization of a slurry of finely-divided silica particles in an aqueous fluosilicic acid solution, the silica present being in excess of that required to react with the HF resulting from the vaporization.

9. The process of claim 5 in which the suspension is formed by heating an aqueous solution of fluosilicic acid having finely-divided particles of crystalline silica suspended therein under superatmospheric pressure to a temperature in excess of its normal vaporizing temperature and thereafter injecting it into a zone of decreased pressure, thereby suddenly converting the solution to vapors in which the suspended silica is uniformly dispersed.

10. The process of claim 9 in which the suspension of crystalline silica particles in aqueous fluosilicic acid is produced by reacting silicon tetrafluoride with water in the the liquid state.

11. The process of claim 5 in which any unreacted silica is separated from the resultant vapor mixture and thereafter resuspended in the said vapor mixture, the temperature being maintained within the specified range.

12. The process of claim 1 and including the subsequent raising of the temperature of said reformed vapor mixture above about 600° C. and hydrolyzing the $SiF_4$ to form finely divided amorphous silica and HF, whereby the reaction of most of the HF constituent of said vapor mixture obtained from fluosilicic acid results in an increased yield of finely divided amorphous silica from said fluosilicic acid.

References Cited by the Examiner

UNITED STATES PATENTS

| | | | |
|---|---|---|---|
| 2,861,872 | 11/1958 | Heller et al. | 23—182 XR |
| 3,203,759 | 8/1965 | Flemmert | 23—182 |

References Cited by the Applicant

UNITED STATES PATENTS

| | | |
|---|---|---|
| 2,535,036 | 12/1950 | Broughton. |
| 2,631,083 | 3/1953 | Engleson et al. |
| 2,819,151 | 1/1958 | Flemmert. |
| 2,833,628 | 5/1958 | Molstad. |

OTHER REFERENCES

"Equilibrium in the System Silicon Tetrafluoride-Water," Lenfesty et al., Industrial and Engineering Chemistry, vol. 44, No. 6, June 1952.

OSCAR R. VERTIZ, *Primary Examiner.*

MAURICE A. BRINDISI, *Examiner.*

H. S. MILLER, A. J. GREIF, *Assistant Examiners.*